Aug. 26, 1952     T. W. PAUL     2,608,042
DEMOUNTABLE TRACTOR MOWER
Filed Oct. 19, 1946     3 Sheets-Sheet 3
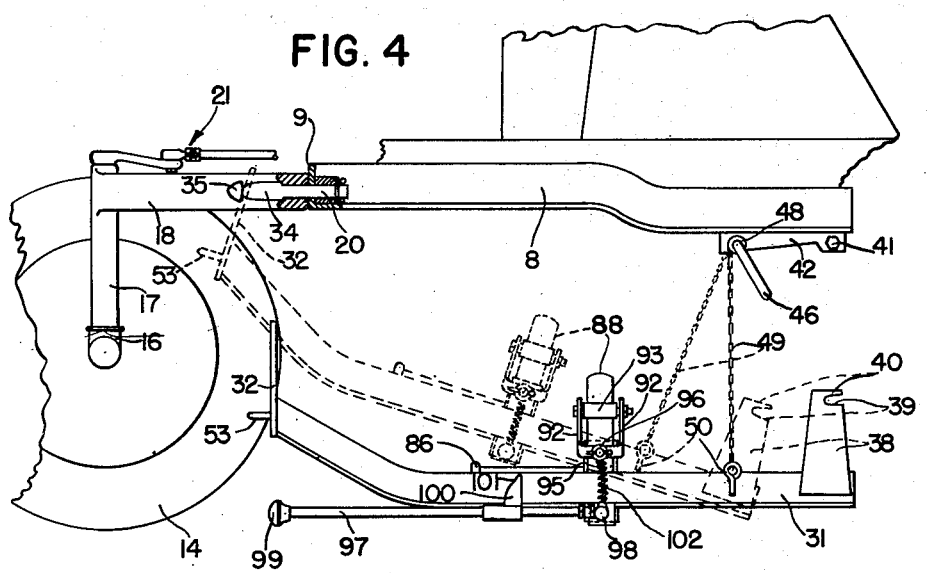
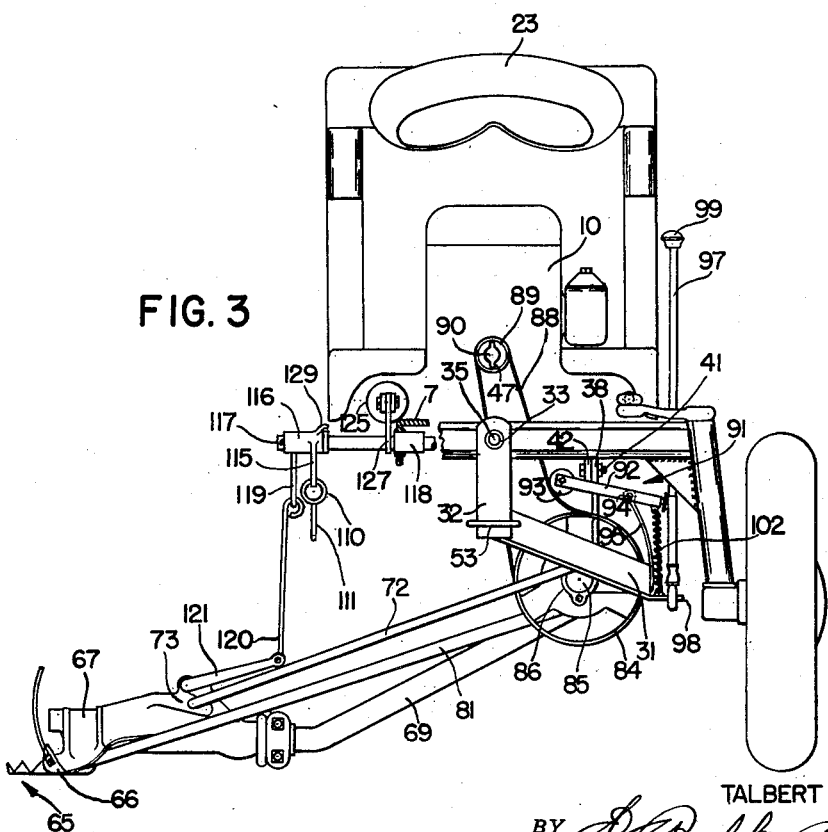
INVENTOR
TALBERT W. PAUL
BY
ATTORNEYS Patented Aug. 26, 1952

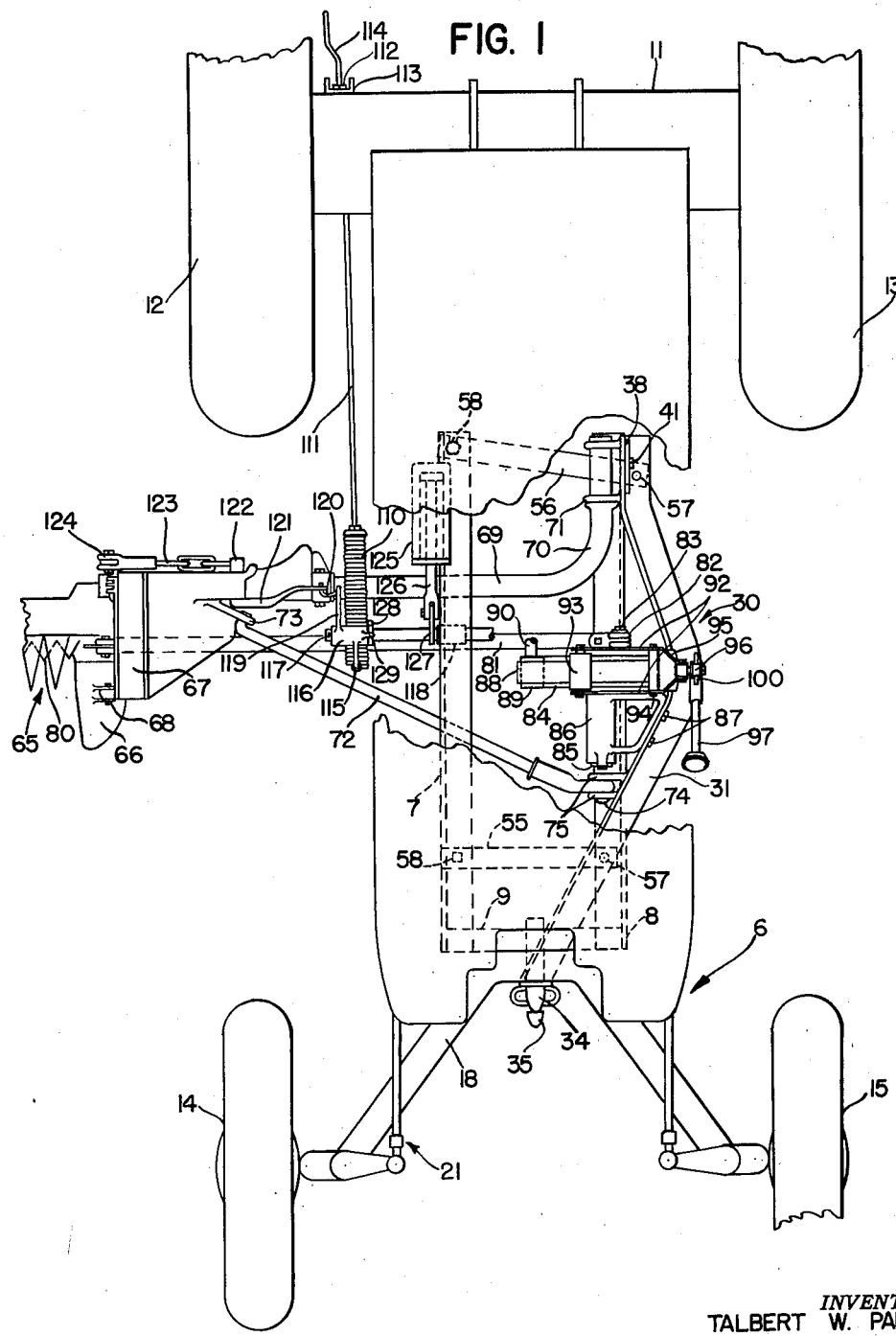

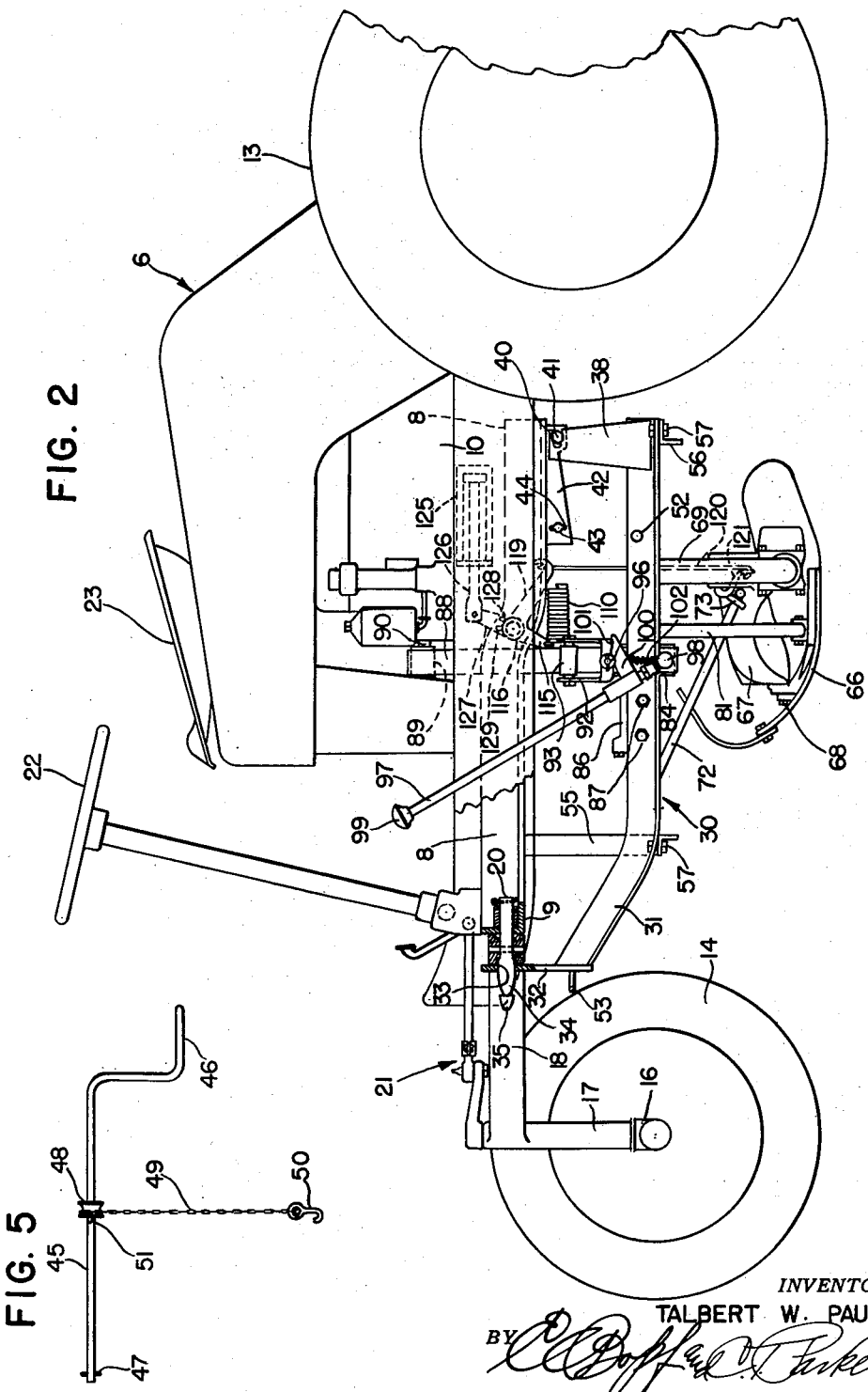

2,608,042

UNITED STATES PATENT OFFICE 2,608,042

DEMOUNTABLE TRACTOR MOWER

Talbert W. Paul, Moline, Ill., assignor to Deere & Company, Moline, Ill., a corporation of Illinois Application October 19, 1946, Serial No. 704,407

6 Claims. (Cl. 56—25)

1

The present invention relates generally to tractor mowers and more particularly to mowers of the type which are designed as attachments for tractors, to be mounted on and wholly supported by the body of the tractor during operation.

The principal object of my invention relates to the provision of a novel and improved tractor mower which can quickly and easily be mounted on the tractor with less effort than is required for mounting detachable mowers heretofore known to those skilled in the art.

A further object of my invention relates to the provision of a novel and extremely simple and inexpensive device for hoisting the mower frame to its mounted position on the tractor and which eliminates the necessity for holding the mower frame in place with one hand while bolts or other securing means are inserted with the other hand.

These and other objects and advantages of my invention will be apparent to those skilled in the art after a consideration of the following description, in which reference is had to the drawings appended hereto, in which:

Figure 1 is a top plan view of a tractor with a mower mounted thereon embodying the principles of my invention, portions of the tractor being broken away to more clearly disclose the mower;

Figure 2 is a side elevational view of the tractor and mower mounted thereon, with portions of the tractor shown in section;

Figure 3 is a front elevational view of the tractor and mower, one front wheel of the tractor being omitted to expose the details of construction of the mower;

Figure 4 is a side elevational view showing a portion of the tractor, and showing in solid lines the mower frame suspended on the hoisting device as the first step in the process of mounting the mower on the tractor, and showing in dotted lines the position of the mower frame after the front end has been mounted on the supporting stud on the tractor; and Figure 5 is a detailed view, drawn to an enlarged scale, showing the tractor crank with hoist attachments thereon.

Referring now to the drawings, the tractor is indicated in its entirety by the reference numeral 6 and is preferably of the type disclosed in U. S. Patent 2,378,615 granted to Brown June 19, 1945. Briefly, the tractor 6 comprises a body or frame including a pair of laterally spaced longitudinally extending structural frame members 7, 8 connected at their forward ends to a transverse structural angle member 9 and rigidly fixed at their rear ends on opposite sides of an internal combustion engine housing 10. The engine housing 10 is rigidly connected to a transverse rear axle housing 11, which is mounted at its opposite ends on a pair of laterally spaced rear traction wheels 12, 13. The front end of the tractor 6 is carried on a pair of laterally spaced dirigible wheels 14, 15, which are mounted on dirigible spindles 16 carried in vertical sleeves 17 which are formed rigidly with a U-shaped supporting frame 18. The center portion of the U-shaped frame 18 is pivoted on a fore and aft extending axis by means of a longitudinally disposed pivot pin or stud 20 journaled in the transverse frame member 9. Thus, the U-shaped frame 18 can pivot about the fore and aft extending axis of the stud 20 to equalize the weight of the tractor upon the wheels 14, 15. The dirigible wheels are connected by suitable steering linkage 21 with a steering wheel 22 disposed in front of the operator's seat 23 on the tractor.

The implement attachment is in the form of a mower, generally indicated by reference numeral 30, which comprises a rigid frame member 31, which is a structural angle member extending generally fore and aft beneath the tractor. The forward end of the frame member 31 is provided with a rigid, upwardly extending support 32, provided with an aperture 33 in its upper end. The aperture 33 is adapted to slidably engage the forwardly projecting end portion 34 of the pivot stud 20, which is provided with a pointed head portion 35. The projecting portion 34 is tapered forwardly toward the head 35 for reasons which will be explained later.

The rear end of the rigid frame member 31 is provided with an upstanding support 38 rigidly fixed thereto, comprising a plate provided with a notch 39 extending forwardly from the rear edge thereof near the upper end, thereby defining a hook element 40 which is adapted to hook over a transverse bolt 41 supported in a depending plate 42 secured to the underside of the tractor frame member 8 near the rear end thereof.

To facilitate mounting the frame member 31 on the tractor, the plate 42 is provided with a hole 43 spaced ahead of the mounting bolt 41 and having slots 44 extending above and below the hole 43, as best shown in Figure 2. The hole 43 is adapted to receive a shaft 45 having at one end a crank handle 46. For this purpose, I prefer to use the crank supplied with the tractor 6 for starting the motor thereof. The shaft 45 is provided with a transverse pin 47 on its end opposite the handle 46, for the purpose of engaging the usual slotted crank fitting 47' (Figure 3), on the front end of a crank shaft 90. The shaft 45 is also provided with a sheave 48 mounted thereon and fixed thereto, and on which is wound a flexible tension member in the form of a light chain 49, to the end of which is connected a hook 50. The opposite end of the chain 49 is fastened to the sheave 48 so that the chain 49 can be wound on the sheave 48 by rotating the shaft 45 by means of the handle 46. The sheave 48 is provided with a pair of axially projecting lugs 51 rigidly fixed thereto on opposite sides of the shaft 45, respectively. The lugs 51 are adapted to be inserted into the slots 44 to hold the crank shaft 45 against rotation.

The mower supporting frame 31 can quickly and with very little effort be installed in mounted position upon the tractor 6 as follows: The crank shaft 45 is inserted into the hole 43 in the depending plate 42, the pin 47 passing through the slots 44 in the plate, and the shaft 45 is shifted inwardly until the sheave 48 is adjacent the plate 42, but without inserting the lugs 51 into the slots 44. The tractor is driven over the mower 30 to position the latter, as shown in solid lines in Figure 4, with the mower 30 lying upon the ground beneath the tractor. The hook 50 on the end of the chain 49 is then engaged with an aperture 52 (see Figure 2) in the vertical flange of the frame member 31. The operator then turns the crank handle 46 about one revolution, thereby raising the rear end of the frame member 31 clear of the ground. He then pushes the crank inwardly to engage the lugs 51 with the slots 44, thereby retaining the frame member 31 in slightly raised position. The operator then steps around to the front of the tractor and grasps a handle 53 fixed to the forward end of the frame member 31, and pulls forwardly and upwardly on the handle 53 thereby swinging the mower frame member 31 forwardly on the chain 49 until the aperture 33 in the front support 32 can be engaged with the forward end of the stud 34. The handle 53 can then be released, for the head 35 of the stud 34 prevents the support 32 from sliding off the forward end thereof.

The opertor then steps back to the side of the tractor, disengages the lugs 51 on the crank 46 from the slots 44, and turns the crank 46, winding the chain 49 upon the sheave 48 and raising the rear end of the frame member 31 until the notch 39 is in register with the supporting bolt 41, but in front of the latter. The crank is then secured in this position by sliding it inwardly to engage the lugs 51 with the slots 44, after which the frame member 31 can be pushed rearwardly to hook the hook element 40 over the bolt element 41. This causes the support 32 to slide rearwardly on the stud 34 to the position shown in Figure 2. The bolt 41 is then tightened to secure the frame member in mounted position.

A pair of front and rear transverse bracing members 55, 56 can later be attached by bolts 57 to the forward and rearward portions of the horizontal flange of the frame member 31, respectively, and by other bolts 58 to the tractor frame member 7, to rigidly fix the frame member 31 in mounted position on the tractor.

The mower cutter bar 65 is conventional in construction and is mounted on a conventional shoe 66, which is pivotally connected to a shoe arch 67 by longitudinally aligned pivot bolts 68 in the usual manner. The shoe arch 67 is mounted on a supporting arm 69 which is inclined transversely beneath the tractor and is turned rearwardly at 70 to provide a supporting portion which is journaled in a bracket 71 rigidly fixed, as by welding, to the rear end of the frame member 31, thereby providing for vertical swinging movement of the arm 69 and cutter bar 65 about a fore and aft extending axis. The shoe arch 67 is connected to the intermediate portion of the frame member 31 by means of a tie rod 72, the outer end of which is swingably connected to a lug 73 on the shoe arch and the forward end of which is pivotally connected by a fore and aft extending pivot bolt 74 to a pair of lugs 75 welded to the inner side of the vertical flange of the frame member 31. The pivot bolt 74 is substantially coaxial with the rearwardly turned supporting portion 70 of the arm 69, thereby providing for vertical swinging movement of the arm and cutter bar. The cutter bar is provided with a conventional reciprocating sickle 80, which is driven by a pitman rod 81, which extends laterally upwardly and inwardly to a journal bearing 82 on a crank 83, which is mounted on a pulley 84. The pulley 84 is mounted on a fore and aft extending shaft 85 that is journaled in a bearing casting 86 rigidly fixed by suitable bolts 87 to the vertical flange of the frame member 31, the axis of the pulley shaft 85 being generally in alignment with the axis of swinging movement of the arm 69 and tie rod 72.

The pulley 84 is driven by a flat belt 88 which is trained over the pulley 84 and over a drive pulley 89 mounted on the forwardly extended crank shaft 90 of the engine 10. A belt tightener 91 is provided for tightening and loosening the belt 88 relative to the driving and driven pulleys 89, 84. The belt tightener 91 includes a lever arm 92 comprising a pair of spaced bars between which is journaled an idler pulley 93. The arms 92 are pivotally mounted on a fore and aft extending pin 94 on a plate 95, which is rigidly fixed to the frame member 31. The outer end of the arm 92 extends outwardly beyond the pivot pin 94 and carries a roller 96 journaled thereon on a transverse axis. A control lever 97 is pivotally mounted at 98 on the frame member 31 for swinging movement in a fore and aft extending vertical plane and has at its upper end a handle 99 which is convenient to the operator on the tractor seat 23. The control lever 97 is provided with a rearwardly projecting camming lug 100 the upper edge of which is curved to engage the roller 96 and is adapted to force the latter upwardly when the lever 97 is pushed forwardly, thereby urging the idler pulley 93 against the outside surface of the belt 88 to tighten the latter. The camming surface is provided with a shallow notch 101 near its outer end to receive the roller 96 and retain the arm 92 in belt tightening position. A coil spring 102 is connected between the outer end of the lever 92 near the roller 96 and the supporting frame member 31, for the purpose of relieving the pressure of the idler 93 against the belt 88 when the control lever 97 is swung rearwardly. In Figure 2 the lever 97 is shown in belt loosening position with the roller 96 disengaged from the notch 101 and the spring 102 holding the arm 92 so that very little pressure is applied to the belt 88. The spring 102 also acts through the roller 96 to hold the lever 97 in a raised position. It frequently happens, however, that when the frame member 31 is lowered to dismounted position on the ground, as shown in solid lines in Figure 4, that the lever 97 is retained in raised position by the spring 102, although the belt 88 is removed from the motor pulley 89. Then, when the tractor is driven forwardly over the mower, the lever 97 engages the rear axle housing 11 of the tractor, but no damage is done to the belt tightening mechanism, for the lever 97 is merely pushed forwardly as the tractor drives away, bringing the camming lug 100 forwardly beyond the roller 96 to allow the lever 97 to drop to the ground as shown in Figure 4.

The mower is provided with the usual conventional counterbalancing mechanism including a spring 110, one end of which is connected to a rod 111 extending rearwardly beneath the axle housing 11 and provided with a collar 112 which engages a vertical channel member 113 secured to the rear of the axle housing. The rear end of the rod 111 is provided with a crank handle 114 for adjusting the tension in the spring 110. The forward end of the spring 110 is secured to an arm 115 of a bell crank 116 which is journaled on a shaft 117 rotatably mounted in a bearing 118 mounted on the tractor frame member 7. The bell crank 116 is also provided with a rearwardly extending arm 119 which is connected through a vertical link 120 to a lever 121, which is one arm of a bell crank journaled on the shoe arch 67. The other arm 122 of the bell crank is connected by conventional linkage 123 to an upstanding arm 124 on the cutter bar 65. Thus, the spring 110 tends to maintain the cutter bar 65 in a generally horizontal position to permit the frame to float along the ground during operation.

The mower can be raised and lowered by means of the power lift hydraulic cylinder 125 which is mounted on the tractor and provided with a piston rod 126 which is connected to an actuating arm 127 mounted on the supporting shaft 117. When the hydraulic cylinder and piston assembly is extended it rotates the shaft 117, which is provided with a lug 128 which is engageable with a lug 129 fixed to the hub of the bell crank 116, thus forming a lost motion connection for raising the arm 69 and cutter bar 65 by power from the hydraulic cylinder 125. Normally, the lugs 128, 129 are separated to permit the floating action of the cutter bar along the ground.

I do not intend my invention to be limited to the particular details shown and described herein, except as set forth in the following claims.

I claim:

1. An implement attachment for a tractor having a body, comprising: a frame adapted to rest at a relatively low level in a dismounted position for elevation to a mounted position at a higher level as respects the tractor body, said frame having spaced apart portions, each including an attaching element, one in the form of an eye and the other in the form of a hook; an elongated stud having provision for connection to the tractor body at a level above that of the eye, said stud being of relatively less thickness than the size of the opening of the eye so as to be loosely receivable by and connectible to the eye to support the frame via the eye when one portion of the frame is elevated to mounted position; said difference in dimension of the eye and stud capacitating the stud-eye connection to provide a pivot at the stud-eye-supported portion of the frame about which the frame may be elevated for raising of the other frame portion to mounted position; said hook having an entrant portion to hook over or unhook from a part of the tractor body spaced from the stud by shifting of the frame relative to the tractor body; and said stud being longer than the entrant portion of the hook to provide for shifting of the stud-eye-supported frame lengthwise of the stud so that the frame may shift in one direction lengthwise of the stud to provide for hooking of the hook to, or in the opposite direction for unhooking of the hook from, such part of the tractor body for respectively effecting mounting or dismounting position of the frame.

2. The invention defined in claim 1, further characterized in that: the stud has a retaining head portion beyond the length of the stud necessary for shifting of the frame to effect hooking and unhooking of the hook and serving to prevent accidental disengagement of the eye therefrom.

3. The invention defined in claim 1, further characterized in that: the portion of the frame having the eye further has a handle element to facilitate manual elevation and lowering of the frame.

4. The invention defined in claim 1, further characterized in that: the portion of the frame having the hook includes means cooperative with such part of the tractor to releasably secure the frame against shifting in such direction as will effect unhooking of the hook.

5. The invention defined in claim 1, further characterized in that: said stud being relatively narrower in lateral dimension than the eye so that the stud-eye connection is cooperative to provide a pivot on the principal axis of the stud for accommodating shifting of the frame laterally.

6. In an agricultural tractor on which an implement may be mounted or to which an implement may be connected, such tractor having a longitudinal body carried on wheel means including a transverse member having a central portion in body-supporting relation to a portion of the tractor body, the improvement comprising: a longitudinal pivot pin for interconnecting the body portion and the central portion of the transverse member to provide for relative articulation of said portions about a longitudinal axis, said pin having an extension thereon providing a projecting mounting and connecting element on or to which an implement may be mounted or connected.

TALBERT W. PAUL.

REFERENCES CITED

The following references are of record in the file of this patent:

UNITED STATES PATENTS

| Number | Name | Date |
|---|---|---|
| 1,340,461 | Ronning et al. | May 18, 1920 |
| 1,404,069 | Swinehart | Jan. 17, 1922 |
| 2,172,987 | Mott | Sept. 12, 1939 |
| 2,245,448 | Simpson | June 10, 1941 |
| 2,260,668 | Horste | Oct. 28, 1941 |
| 2,368,290 | Donald | Jan. 30, 1945 |
| 2,407,006 | Harris | Sept. 3, 1946 |